United States Patent [19]

Rowland

[11] 3,732,744

[45] May 15, 1973

[54] STOP FOR SCREW AND NUT ACTUATOR

[75] Inventor: Dan R. Rowland, Saginaw, Mich.

[73] Assignee: General Motors Corporation, Detroit, Mich.

[22] Filed: Feb. 15, 1972

[21] Appl. No.: 226,426

[52] U.S. Cl. .............................................. 74/424.8 R
[51] Int. Cl. .................................................. F16h 1/18
[58] Field of Search ................................ 74/242.8 R; 192/56 R, 150, 138; 64/11, 28 R; 285/2, 3; 10/23

[56] References Cited

UNITED STATES PATENTS

| | | | |
|---|---|---|---|
| 2,497,424 | 2/1950 | Terdina et al. | 74/424.8 R |
| 3,178,957 | 4/1965 | Martens | 74/424.8 R |

Primary Examiner—Charles J. Myhre
Assistant Examiner—A. Russell Burke
Attorney—W. E. Finken, et al.

[57] ABSTRACT

An improved stop adapted for incorporation into a screw and nut actuator assembly to non-jammingly arrest relative axial motion between the screw and nut portions of the assembly, the stop including a cylindrical surface on the screw portion having formed therein a groove having a semicircular cross section, an annular stop ring having a circular cross section of diameter equal to the width of the groove disposed in the groove and defining a raised abutment on the screw including a shear section of maximum width at the cylindrical surface, an intermediate member disposed around the cylindrical surface inboard of the stop ring adapted for engagement on the latter generally at the shear section thereof, and an anti-friction bearing disposed between the intermediate member and the nut portion of the actuator assembly. When the nut portion engages the bearing the relative rotational motion component of the former is dissipated by the latter while an axial force is generated at the shear section of the stop ring and transferred to the nut portion through the intermediate member and the bearing to arrest axial motion of the nut portion.

4 Claims, 4 Drawing Figures

PATENTED MAY 15 1973 3,732,744

3,732,744

STOP FOR SCREW AND NUT ACTUATOR

This invention relates generally to actuator mechanisms of the screw and nut type and more particularly to an improved stop adapted to non-jammingly arrest relative axial movement between the screw and nut portions of the actuator.

In screw and nut type actuator assemblies, wherein relative rotation between the screw and nut portions effects concurrent relative axial movement therebetween, a need often exists to provide stopping means for positively limiting the relative axial movement. In designing such stops, however, engineers must consider the relatively large axial forces which are likely to be developed between the stop and the nut portion of the actuator due to the typically low helix angle of the thread on the screw portion. Also, means must be provided to prevent the nut portion from frictionally jamming against the stop. A stop according to this invention represents an improvement over known similar devices and incorporates anti-jamming means and maximum stopping capability into a very compact and simple structure.

The primary feature of this invention is that it provides an improved stop adapted to non-jammingly arrest relative axial movement between screw and nut portions of a screw and nut type actuator assembly. Another feature of this invention is that it provides an improved stop which minimizes stress concentrations in the stop supporting screw portion. Still another feature of this invention resides in the provision of a stop including an annular groove in a cylindrical surface on the screw portion, the groove having continuous curvature from lip to lip to suppress the formation of stress concentrations in the screw portion, an annular stop member disposed in the groove with a shear section of the former situated generally between the lips of the groove, and an intermediate member disposed between the stop member and the nut portion, the stop member through the intermediate member arresting relative axial movement of the nut portion generally across the shear section thereof while an anti-friction bearing disposed between the nut portion and the intermediate member effects dissipation of the relative rotational motion component of the nut portion to prevent jamming.

These and other features of this invention will be readily apparent from the following specification and from the drawings wherein.

Figure 1:
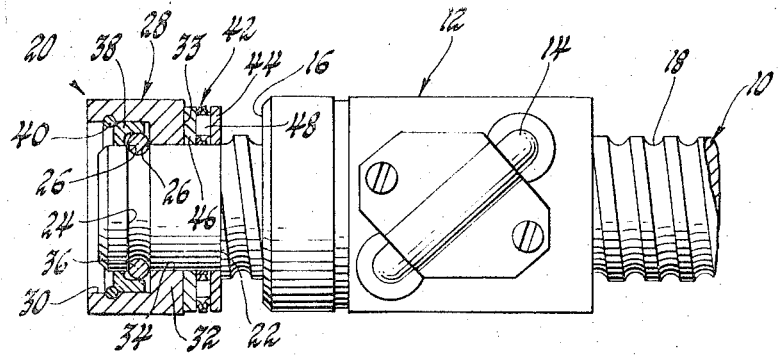
FIG. 1 is an elevational view partially in section of a screw and nut type actuator assembly having incorporated therein a stop according to this invention.

Referring now to FIG. 1 of the drawings, there shown is a portion of a screw and nut type actuator assembly including a screw 10 and a nut 12. The nut 12 is of conventional anti-friction recirculating ball design and includes a ball return guide 14 and an annular front shoulder 16. The recirculating balls seat in a helical thread 18 formed on the screw 10. Accordingly, relative rotation between the screw 10 and the nut 12 effects concurrent relative bodily shiftable movement therebetween axially of the screw. A stop according to this invention and designated generally 20 is disposed on one end of the screw 10 and is adapted, as described hereinafter, to arrest relative axial movement between the nut 12 and the screw 10.

Figure 2:
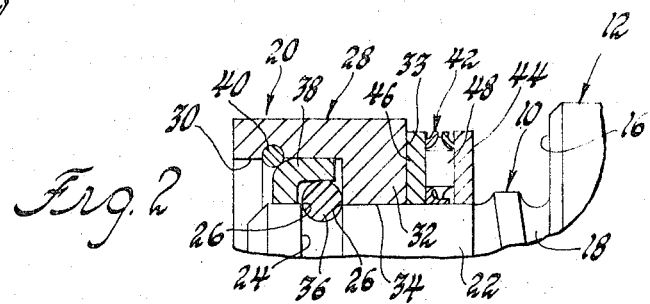
FIG. 2 is an enlarged view of a portion of FIG. 1.

As best seen in FIGS. 1 and 2, helical thread 18 terminates short of the left end of the screw, the remaining portion of the screw defining a cylindrical surface 22. Generally adjacent the left or outboard end of the cylindrical surface 22 the latter has formed therein an annular groove 24 disposed in a plane perpendicular to the longitudinal axis of the screw. The groove 24 is semicircular in cross section and terminates at the cylindrical surface in a pair of circular, axially spaced lips 26 between which the surface of the groove exhibits continuous curvature.

The stop 20 further includes a cylindrical intermediate member 28 having an internal bore 30 of diameter substantially exceeding the diameter of the cylindrical surface 22 and an inturned annular flange 32 having an annular front face 33 and an inside diameter 34 generally equal to the diameter of cylindrical surface 22. The intermediate member is slidably disposed on the cylindrical surface 22 with the bore 30 opening outboard and enclosing groove 24.

Referring again to FIGS. 1 and 2, an annular stop ring 36 having a circular cross section of diameter generally equal to the width of groove 24 is seated in the latter. Because the depth of the groove is equal only to one-half of the cross-sectional diameter of the stop ring, approximately one-half of the latter projects radially outward from surface 22 and defines an annular, raised shoulder having a shear section of maximum cross section disposed between the lips 26 of the groove. To facilitate assembly of the stop, the stop ring 36 is formed from a pair of identical semi-circular half-ring segments. A keeper ring 38, disposed inside the bore 30 and around the stop ring 36 functions to maintain the half-ring segments seated in the groove 24. The keeper ring 38 is retained within the bore 30 by a spring retaining ring 40 seated in an appropriate groove in the intermediate member 28.

As seen best in FIG. 2, the annular flange 32 on the intermediate member 28 engages the stop ring generally in line contact as the cylindrical surface 22 and generally at the shear section of the stop ring. The stop ring, of course, thus limits leftward axial movement of the intermediate member to the inboard lip 26 of the groove 24. An annular anti-friction thrust bearing 42, including a front race 44, a rear race 46, and a plurality of anti-friction elements 48, is disposed around the cylindrical surface 22 between the front face 33 of the annular flange 32 and the front shoulder 16 of the nut 12.

In operation, assuming that the screw 10 is stationary, when torque is applied to the nut 12 to effect rotation and leftward axial movement thereof and engagement is effected between the front race 44 of the thrust bearing and the front shoulder 16 of the nut, an axial force of substantial magnitude is generated on the front race due to the force multiplication characteristic of the thread helix angle. The axial force is transferred through the thrust bearing to the intermediate member 28 and tends to urge the latter leftward. The intermediate member, however, is restrained by the stop ring which is placed in shear across the shear section between generally the outboard half of the groove 24 and the inturned flange 32. The stop ring is, of course, fabricated from a material having substantial shear strength, as for example hardened steel, so that axial forces of relatively large magnitude can be successfully resisted across a relatively narrow section of material. Accordingly, after contact between the nut and the thrust bearing is effected, an axial force for resisting axial movement of the nut is developed at the stop ring and transferred to the nut through the intermediate member and the bearing, the resisting force rapidly increasing in magnitude until axial movement of the nut is fully arrested.

The load carrying capacity of the stop 20 is, of course, a function of the shear capacity of the stop ring. By increasing the cross sectional diameter of the stop ring, the capacity of the stop can be increased. Further, by arranging the elements of the stop as described to apply the stopping force across the shear section of the stop ring, an extremely compact structure with relatively large capacity is achieved. Still further, the configuration of the groove 24 represents an important feature of this invention. More particularly, the force generated at the stop ring for arresting axial movement of the nut places the screw in tension between the outboard half of the groove and the portion of thread 18 engaged by the anti-friction balls within the nut. Those skilled in the art will readily appreciate that the tensile force thus generated is of substantial magnitude and apt to form concentrations of high stress within the screw at any sharp corner or the like. The groove 24, however, as opposed to screw threads or the like, has continuous curvature from lip to lip for the purpose of suppressing the formation of such stress concentrations. Accordingly, the stop 20 has the potential for longer service life and higher stopping capacity than heretofore known stops of corresponding size having, for example, threadedly attached abutment means.

With respect to the relative rotational component of motion of the nut 12, when contact is effected between the nut and the front race 44 of the bearing, friction is developed therebetween causing the front race to rotate as a unit with the nut. Simultaneously, friction is similarly developed between the front face 33 of the annular flange 32 and the rear race 46 of the bearing. The anti-friction elements 48, however, prevent the development of similar friction between the races of the bearing so that the nut has no tendency to jam or wedge against the stop, the relative rotational component of nut motion thus being effectively dissipated independently of the axial component of motion. It will, of course, be apparent that substantial friction develops between the screw, the stop ring, and the intermediate member as the axial motion of the nut is arrested and this friction effectively counteracts any tendency of the intermediate member to rotate as a unit with the nut 12.

Figure 3:
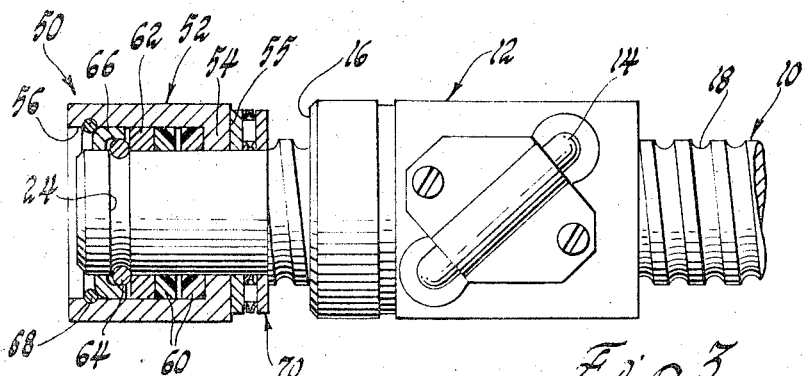
FIG. 3 is similar to FIG. 1 but showing a modified stop according to this invention.
Figure 4:
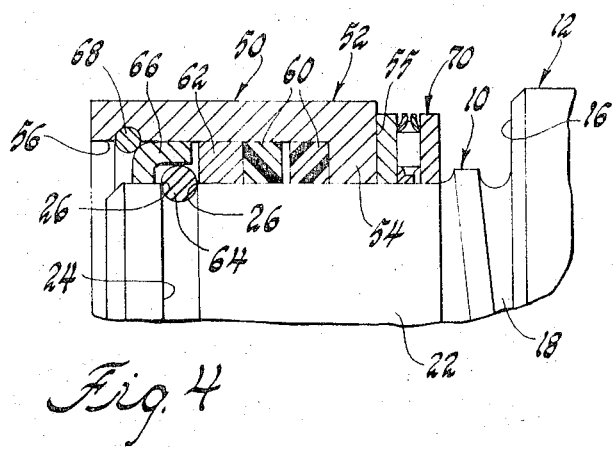
FIG. 4 is an enlarged view of a portion of FIG. 3.

Referring particularly now to FIGS. 3 and 4, thereshown in combination with the screw 10 and the nut 12 is a modified stop according to this invention designated generally 50. The modified stop 50 includes an elongated cylindrical intermediate member 52 having an inturned annular flange 54 at one end thereof defining an annular front face 55 and an internal bore 56. The annular flange 54 is closely and slidably disposed around the cylindrical surface 22 of the screw thereby to support the intermediate member 52 on the screw for axial bodily shiftable movement with the bore 56 enclosing the groove 24.

The intermediate member 52 cooperates with cylindrical surface 22 in defining an annular chamber in which are disposed a pair of compression rings 60 fabricated from an elastically deformable material such as rubber, nylon, or the like. A bearing ring 62, fabricated from steel or the like, is disposed in the annular chamber outboard of the compression rings but inboard of the annular groove 24.

A stop ring 64, identical to stop ring 36 in stop 20, is disposed in the groove 24 and retained therein by a keeper ring 66. The keeper ring is maintained in contact with the stop ring and within the bore 56 by a retaining ring 68 seated in an appropriate groove in the intermediate member 52. An anti-friction thrust bearing 70 is disposed on the screw around the cylindrical surface 22 between the front face 55 of the annular flange 54 and the shoulder 16 of the nut.

In operation, the modified stop 50 functions to nonjammingly and cushioningly arrest relative axial movement between the nut and the screw. More particularly, and again assuming the screw stationary, as the nut approaches the left end of the screw contact is initiated between the annular shoulder 16 and the front race of the bearing 70. The anti-friction elements incorporated in the bearing effectively separate the motion of nut into rotational and axial components, the rotational component effecting relative rotation between the front and rear races of the bearing and the axial component generating axial forces on the intermediate member 52 through the bearing as described hereinbefore with respect to stop 20.

The axial forces, of course, initiate leftward bodily movement of the intermediate member 52 as a unit with the nut, the annular flange 54 functioning to urge the compression rings 60 and the bearing ring 62 leftward, FIGS. 3 and 4. The bearing ring, however, engages the stop ring 64 generally in line contact at the shear section of the latter and is prevented thereby from moving leftward so that continued axial movement of the intermediate member effects elastic compression of the compression rings 60 between the stop ring and the annular flange 54. As the rings 60 are compressed, a force of increasing magnitude is generated on the intermediate member 52 resisting continued movement of the intermediate member and the nut, the force being applied across the shear section of the stop member and onto the outboard half of groove 24. When the magnitude of the resisting force equals the magnitude of the axial force generated by the nut, axial motion of the latter ceases. As described hereinbefore, the smooth curvature of the groove effectively suppresses the formation of stress concentrations in the screw in the area of the groove thereby to maximize the bearing capacity of the stop.

Having thus described the invention, what is claimed is:

1. In an actuator assembly including a screw portion and a nut portion operatively associated with said screw portion in a manner whereby relative rotation therebetween effects concurrent relative bodily shiftable movement therebetween axially of said screw portion, the combination comprising, means defining a cylindrical surface on said screw portion, means defining an annular groove in said cylindrical surface disposed in a plane perpendicular to the axis of said screw portion, said groove having a pair of axially spaced lips at said cylindrical surface and continuous curvature therebetween to suppress the formation of stress concentrations in the area of said groove when a tensile force is applied to said screw portion at said groove, a stop member disposed in said groove and defining a shear section disposed generally between the lips of said groove and a raised portion projecting radially outwardly of said cylindrical surface, an intermediate means disposed between said stop member and said nut portion engageable on the latter and on said stop member generally at said shear section of the latter, said stop member through said intermediate means being operative to arrest relative axial bodily motion of said nut portion, and anti-friction bearing means disposed between said intermediate means and said nut portion for dissipating relative rotation between the latter and said intermediate means.

2. In an actuator assembly including a screw portion and a nut portion operatively associated with said screw portion in a manner whereby relative rotation therebetween effects concurrent relative bodily shiftable movement therebetween axially of said screw portion, the combination comprising, means defining a cylindrical surface on said screw portion, means defining an annular groove in said cylindrical surface disposed in a plane perpendicular to the axis of said screw portion, said groove being semicircular in cross section and terminating at said cylindrical surface in a pair of axially spaced lips, the continuous curvature of said groove effectively suppressing the formation of stress concentrations in the area of said groove when said screw portion is subjected to tensile forces applied at said groove, an annular stop member having a circular cross section of diameter substantially equal to the width of said groove, said stop member being seated in said groove and defining an annular raised portion projecting radially outward of said cylindrical surface and a shear section disposed generally between the lips of said groove, an intermediate means disposed around said cylindrical surface between said raised portion and said nut portion engageable on the latter and on said raised portion generally at said shear section of said stop member, said stop member through said intermediate means being operative to arrest relative axial movement of said nut portion, and anti-friction bearing means disposed between said intermediate means and said nut portion operative to dissipate relative rotation between the latter and said intermediate means.

3. In an actuator assembly including a screw portion and a nut portion operatively associated with said screw portion in a manner whereby relative rotation therebetween effects concurrent relative bodily shiftable movement therebetween axially of said screw portion, the combination comprising, means defining a cylindrical surface on said screw portion, means defining an annular groove in said cylindrical surface disposed in a plane perpendicular to the axis of said screw portion, said groove being semicircular in cross section and terminating at said cylindrical surface in a pair of axially spaced lips, the continuous curvature of said groove effectively suppressing the formation of stress concentrations in the area of said groove when said screw portion is subjected to tensile forces applied at said groove, an annular stop ring having a circular cross section of diameter substantially equal to the width of said groove, said stop ring being seated in said groove and defining an annular raised portion projecting radially outward of said cylindrical surface and a shear section disposed between the lips of said groove, means dividing said stop ring into a pair of identical semicircular half-ring segments for facilitating installation and removal of said stop ring from said screw portion, a cylindrical intermediate member disposed about said cylindrical surface and over said stop ring, means defining an inturned annular flange on said intermediate member closely slidably engaging said cylindrical surface and disposed between said raised portion and said nut portion, said annular flange being engageable on said nut portion and on said stop ring generally at said shear section of the latter, said stop ring through said inturned flange being operative to arrest relative axial movement of said nut portion, a keeper ring disposed within said intermediate member and around said stop ring for maintaining said half-ring segments in said groove, a retaining ring disposed on said intermediate member outboard of said keeper ring for retaining said keeper ring in said intermediate member, and anti-friction bearing means disposed between said intermediate member and said nut portion operative to dissipate relative rotation between the latter and said intermediate member.

4. In an actuator assembly including a screw portion and a nut portion operatively associated with said screw portion in a manner whereby relative rotation therebetween effects concurrent relative bodily shiftable movement therebetween axially of said screw portion, the combination comprising, means defining a cylindrical surface on said screw portion, means defining an annular groove in said cylindrical surface disposed in a plane perpendicular to the axis of said screw portion, said groove being semicircular in cross section and terminating at said cylindrical surface in a pair of axially spaced lips, the continuous curvature of said groove effectively suppressing the formation of stress concentrations in the area of said groove when said screw portion is subjected to tensile forces applied at said groove, means defining an annular stop ring having a circular cross section of diameter substantially equal to the width of said groove, said stop ring being seated in said groove and defining an annular raised portion projecting radially outward of said cylindrical surface and a shear section disposed between the lips of said groove, means dividing said stop ring into a pair of identical semicircular half-ring segments for facilitating installation and removal of said stop ring from said screw portion, an elongated cylindrical intermediate member disposed around said cylindrical surface and radially spaced therefrom, means defining an inturned annular flange on said intermediate member closely slidably received on said cylindrical surface and engageable on said nut portion, said flange and said intermediate member defining an annular chamber closed at one end and extending over said stop ring, an annular abutment ring closely slidably received on said cylindrical surface in said annular chamber inboard of said stop ring, said abutment ring being engageable on said stop ring generally at said shear section of the latter, a plurality of annular elastically deformable compression rings disposed in said chamber between said abutment ring and said annular flange, said stop ring through said abutment and said resilient rings and said annular flange being operative to cushioningly arrest relative axial bodily movement of said nut portion, a keeper ring disposed within said intermediate member and around said stop ring for maintaining said half-ring segments in said groove, a retaining ring disposed on said intermediate member outboard of said keeper ring for retaining said keeper ring in said intermediate member, and anti-friction bearing means disposed between said intermediate member and said nut portion operative to dissipate relative rotation between the latter and said intermediate member.

* * * * *